US010046447B2

(12) United States Patent
Pless et al.

(10) Patent No.: US 10,046,447 B2
(45) Date of Patent: Aug. 14, 2018

(54) METHOD AND APPARATUS FOR REMOVING A STRAINER BASKET FROM A STEAM VALVE

(71) Applicant: Siemens Energy, Inc., Orlando, FL (US)

(72) Inventors: Maxwell Pless, Pittsburgh, PA (US); Stuart C. Weddle, Independence, MO (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 15/346,076

(22) Filed: Nov. 8, 2016

(65) Prior Publication Data

US 2018/0126315 A1 May 10, 2018

(51) Int. Cl.
*B25B 27/06* (2006.01)
*F16K 27/02* (2006.01)
*F16K 47/08* (2006.01)
*B01D 46/42* (2006.01)
*F01K 21/06* (2006.01)
*B25B 27/24* (2006.01)

(52) U.S. Cl.
CPC ........ *B25B 27/064* (2013.01); *B01D 46/4227* (2013.01); *B25B 27/062* (2013.01); *B25B 27/24* (2013.01); *F01K 21/06* (2013.01); *F16K 27/0272* (2013.01); *F16K 47/08* (2013.01); *Y10T 137/6065* (2015.04); *Y10T 137/6109* (2015.04); *Y10T 137/8085* (2015.04)

(58) Field of Classification Search
CPC ......... Y10T 137/6065; Y10T 137/8085; Y10T 137/6109; B01D 46/4227; F16K 47/08; F16K 27/0272; B25B 27/062; B25B 27/064
See application file for complete search history.

(56) References Cited

U.S. PATENT DOCUMENTS

| 1,595,246 A | 8/1926 | Ragsdale |
| 2,507,003 A | 5/1950 | Gagne |
| 2,883,741 A | 4/1959 | Yerkes |

(Continued)

FOREIGN PATENT DOCUMENTS

| CN | 203363237 U | 12/2013 |
| WO | 2013182696 A1 | 12/2013 |

OTHER PUBLICATIONS

PCT International Search Report and Written Opinion of International Searching Authority dated Feb. 12, 2018 corresponding to PCT International Application No. PCT/US2017/060114 filed Nov. 6, 2017.

*Primary Examiner* — Atif Chaudry

(57) ABSTRACT

A valve strainer basket of an interceptor-type or control-type steam valve is removed from its nested orientation within a counter bore and valve rim of the valve casing. A strong back beam straddles the casing rim over the strainer basket. It is coupled to the strainer basket, such as by engagement of threaded rods into threaded apertures formed in the strainer basket rim. Biasing cylinders, such pressurized fluid cylinders or screw jacks, are interposed between the casing rim and opposite ends of the strong back beam. When the biasing cylinders are actuated, the strong back beam rises, lifting and separating the strainer rim from its nested engagement with the counter bore of the valve casing.

16 Claims, 6 Drawing Sheets

(56) References Cited

U.S. PATENT DOCUMENTS 4,646,412 A * 3/1987 Eade ................... B25B 27/023
                                                    29/259
5,129,133 A * 7/1992 Reesor ................ B25B 27/026
                                                    29/252

* cited by examiner

METHOD AND APPARATUS FOR REMOVING A STRAINER BASKET FROM A STEAM VALVE

TECHNICAL FIELD

The invention relates to methods and apparatus for repairing steam valves that are used in steam cycle, fossil- or nuclear-fueled, power generation plants. More particularly the invention relates to methods and apparatus for extracting a strainer basket from an interceptor-type steam valve, used in fossil-fuel power plants, or a control-type steam valve, used in nuclear-fuel power plants.

BACKGROUND

Interceptor valves, also referred to as intercept valves, or control valves are utilized in steam-cycle, power generation plants, to regulate steam flow into steam turbines. Typically, control or interceptor valves are utilized to throttle, or completely isolate steam flow into intermediate-pressure steam turbines in a steam-cycle power plant. Both control-type or interceptor-type steam valves have the same general construction and features. Further description herein will focus on interceptor-type steam valves, but the same concepts are also applicable to control-type steam valves.

FIG. 1 shows an exemplary, known interceptor valve 10 that is utilized in steam-cycle power plants. The interceptor valve 10 includes a valve casing 12, which defines an internal plenum 14 for passage of pressurized steam from an inlet to an outlet. A valve body 15 throttles steam flow from the inlet through the outlet, by translating within the plenum 14. In FIG. 1, the valve body is in a closed position, which blocks steam flow. An upper end of the valve casing 12 casing defines a casing rim 16 that circumscribes the internal plenum 14. The casing rim 16 includes a counter bore 17 that defines its inner diameter, and an upper surface 18, for opposed orientation with a valve bonnet 20. The valve bonnet 20 retains the valve body 15, and is secured to the casing rim 16 by bonnet bolts 21.

Referring to FIGS. 1 and 2, the interceptor valve 10 retains a valve strainer basket 22 for inhibiting passage of foreign matter or other debris entrained within steam flow from passing through the steam outlet. The valve strainer basket 22 includes a strainer rim 24 having an outer diameter that is slidably nested within the counter bore 17 of the casing rim 16. The strainer rim 24 includes an upper surface 26, which defines opposed, first 28 and second 30 female-threaded apertures. The valve strainer basket 22 has a porous strainer skirt 32 that projects downwardly from the strainer rim 24 into the internal plenum 14 of the valve casing 12. The porous strainer skirt 32 is typically fabricated with an array of piercing through-holes, and is interposed in the steam flow between the inlet and outlet of the valve casing, circumscribing the valve body 15.

Periodically, the valve strainer basket 22 is removed from the interceptor valve 10, to remove accumulated foreign matter from its surfaces and from within the internal plenum 14. During plant operation, foreign matter often accumulates in the circumferential gap between the counter bore 17 of the valve casing 12 and the outer diameter of the nested strainer rim 24, which inhibits slidable, axial separation of the rim from the counter bore. In some operating environments, the valve strainer basket 22, including its strainer rim 24 thermally and/or mechanically deform, creating a tight interference fit between the strainer rim and the counter bore 17, which also inhibits their axial separation during strainer basket removal for maintenance. Typically, strainer baskets 22 have a static weight of 500-1000 pounds (approximately 225-450 kg).

Combination of any or all of foreign matter accumulation, strainer basket 22 deformation, and static lift weight require hoisting equipment to separate the strainer basket 22 from the valve casing 12. In the past, the strainer basket 22 has been coupled to the boom of a lifting crane, such as by threading eye hooks into the opposed, first 28 and second 30 female-threaded apertures formed in the strainer rim 24, or any other coupling features formed in the strainer basket and coupling a lifting sling to both the eye hooks and crane boom. It is challenging to separate the strainer rim 24 from the counter bore 17 of the valve casing 12 with a crane boom, without potentially damaging the strainer basket 22. Additionally, during plant maintenance cycles there are many parallel demands for crane usage.

SUMMARY OF INVENTION

Exemplary embodiments described herein utilize a strong back beam and biasing cylinders, such as pneumatic or hydraulic lifting cylinders or screw jacks, to separate a strainer rim of a strainer basket from its nested engagement within a counter bore of a valve casing of an interceptor-type steam valve, used in fossil-fuel power plants, or a control-type steam valve, used in nuclear-fuel power plants. The embodiments described herein are useful for removing strainer baskets from either type of steam valve. The strong back beam straddles the casing rim over the strainer basket, and is coupled to the strainer basket, such as by engagement of threaded rods into threaded apertures formed in the strainer basket rim. The threaded rods are coupled to the strong back beam. Biasing cylinders are interposed between the casing rim and opposite ends of the strong back beam. When the biasing cylinders are actuated, the strong back beam rises, thereby lifting and separating the strainer rim from its nested engagement with the counter bore of the valve casing. In some embodiments, the strainer basket is completely removed from the valve casing by coupling a crane sling to the strong back beam, such as by engaging the crane sling with swivels or eyelets mounted on the beam, and raising the crane sling with a crane boom.

Exemplary embodiments of the invention feature a system, including apparatus, for removing a valve strainer basket of a steam valve for steam turbines, whether the valve is an interceptor-type valve or a control-type valve. The system comprises a removal tool, including a strong back beam having a top surface, a bottom surface facing and spanning the upper surfaces of a nested casing rim and a strainer rim, and respective first and second beam ends. The removal tool of the system also includes first and second biasing cylinders, such as screw jacks or pressurized fluid cylinders (e.g., hydraulic and/or pneumatic cylinders) are respectively interposed between the bottom surface of the beam, at first and second ends thereof, and the upper surface of the casing rim, for selectively raising or lowering the beam relative to the nested casing and strainer rims. Respective first and second coupling members couple the beam and the strainer basket to each other. In some embodiments, the coupling members are threaded rods, which engage in corresponding female threaded apertures formed in the strainer rim, with the threaded rods in turn coupled to the strong back beam. Actuation of the first and second biasing cylinders separates the strong back beam from the upper surface of the casing rim, and extracts the outer diameter of the strainer rim out of slidable, nested engagement within the counter bore of the casing rim. In some embodiments, ends of the strong back beam are interposed between spaced bonnet studs on the casing rim, in order to prevent lateral shifting of the beam relative to the casing rim. In some embodiments, beam restraints, such as restraining straps, are coupled to at least one of the bonnet studs, for restraining inadvertent separation of the beam from the casing rim. In some embodiments, the strong back beam is fabricated from welded plates.

Other exemplary embodiments of the invention feature methods for removing a valve strainer basket of steam valve, whether an interceptor-type valve or a control-type valve, for steam turbines, using the previously described system and removal tool. As previously noted the provided removal tool system includes a strong back beam having a top surface, a bottom surface, and respective first and second beam ends; first and second biasing cylinders; and first and second coupling members, which are respectively coupled to the strong back beam and the strainer basket, such as threaded rods coupled to the beam and mating apertures formed in the strainer basket rim. In practicing the exemplary methods, the first and second biasing cylinders are placed on opposed circumferential sides of the upper surface of the casing rim. The bottom surface of the respective first and second ends of the strong back beam are in turn placed on the respective first and second biasing cylinders, spanning the upper surfaces of the casing rim and the strainer rim, so that the first and second biasing cylinders are interposed between the bottom surface of the beam, at first and second ends thereof and the casing rim. In some embodiments, the biasing cylinders are attached to the strong back beam, so that all three components are placed simultaneously on the casing rim. The first and second coupling members are coupled to the strong back beam and the strainer basket, such as by coupling threaded rods to the beam and engaging the male ends of the rods into threaded engagement with female threaded apertures in the strainer rim. In this way, the strainer rim raises with the strong back beam. The first and second biasing cylinders are actuated, separating the strong back beam from the upper surface of the casing rim and extracting the outer diameter of the strainer rim out of slidable, nested engagement within the counter bore of the casing rim. If desired, a portion of or the entire valve strainer including its strainer basket is selectively removed from the valve casing by lifting the strainer basket skirt above the casing rim, such as with a crane whose boom is coupled to the strong back beam.

The respective features of the exemplary embodiments of the invention may be applied jointly or severally in any combination or sub-combination.

BRIEF DESCRIPTION OF DRAWINGS

The exemplary embodiments of the invention can be understood by considering the following detailed description in conjunction with the accompanying drawings, in which.

To facilitate understanding, identical reference numerals have been used, where possible, to designate identical elements that are common to the figures. The figures are not drawn to scale.

DESCRIPTION OF EMBODIMENTS

Exemplary embodiments of the invention utilize a strong back beam and biasing cylinders, such as pneumatic or hydraulic lifting cylinders or screw jacks, to separate a strainer rim of a strainer basket from its nested engagement within a counter bore of a valve casing of an interceptor-type steam valve, or of a control-type steam valve. The strong back beam straddles the casing rim over the strainer basket. It is coupled to the strainer basket, such as by engagement of threaded rods into threaded apertures formed in the strainer basket rim. The threaded rods are coupled to the strong back beam. Biasing cylinders are interposed between the casing rim and opposite ends of the strong back beam. When the biasing cylinders are actuated, the strong back beam rises, thereby lifting and separating the strainer rim from its nested engagement with the counter bore of the valve casing. In some embodiments, the strainer basket is completely removed from the valve casing by coupling a crane sling to the strong back beam, such as by engaging the crane sling with swivels or eyelets mounted on the beam, and raising the crane sling with a crane boom.

Figure 1:
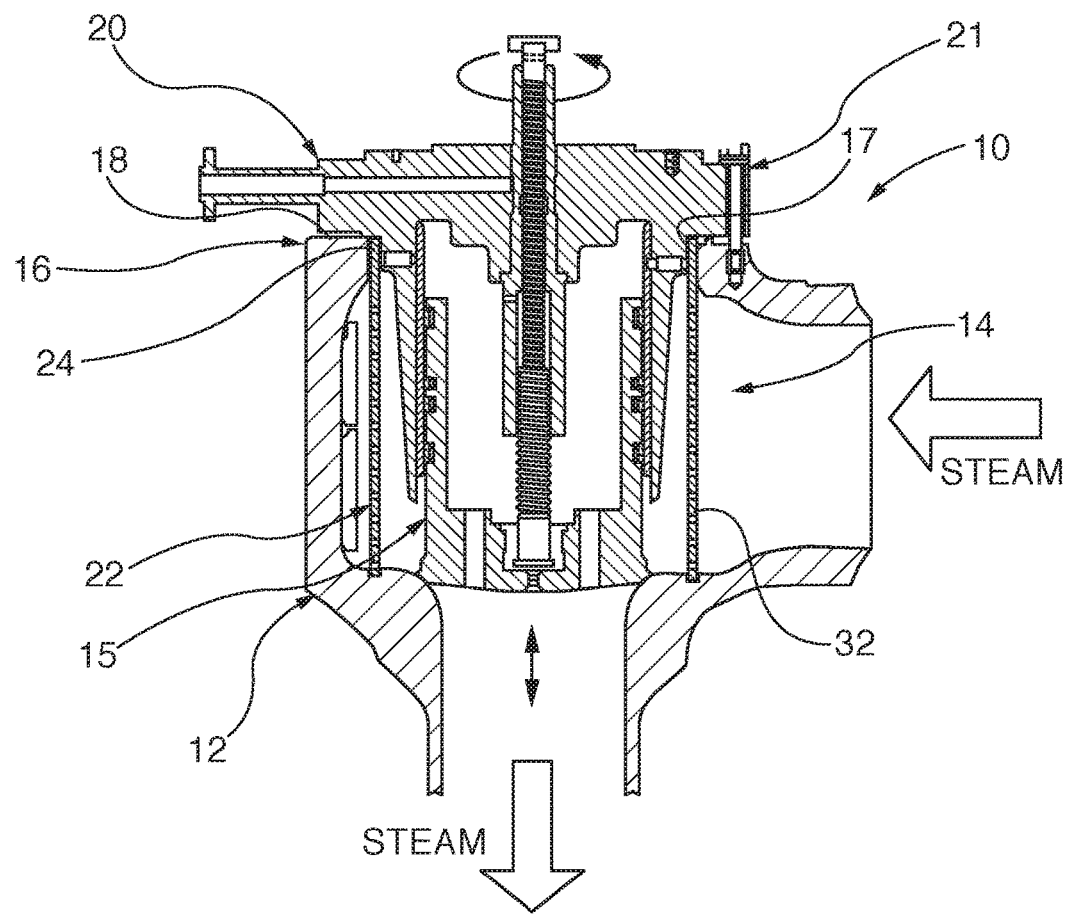
FIG. 1 is an elevational cross section of a known interceptor-type steam valve, including its valve strainer basket, with portions of the valve body above the valve stem, and its related valve body actuation mechanisms removed.
Figure 2:
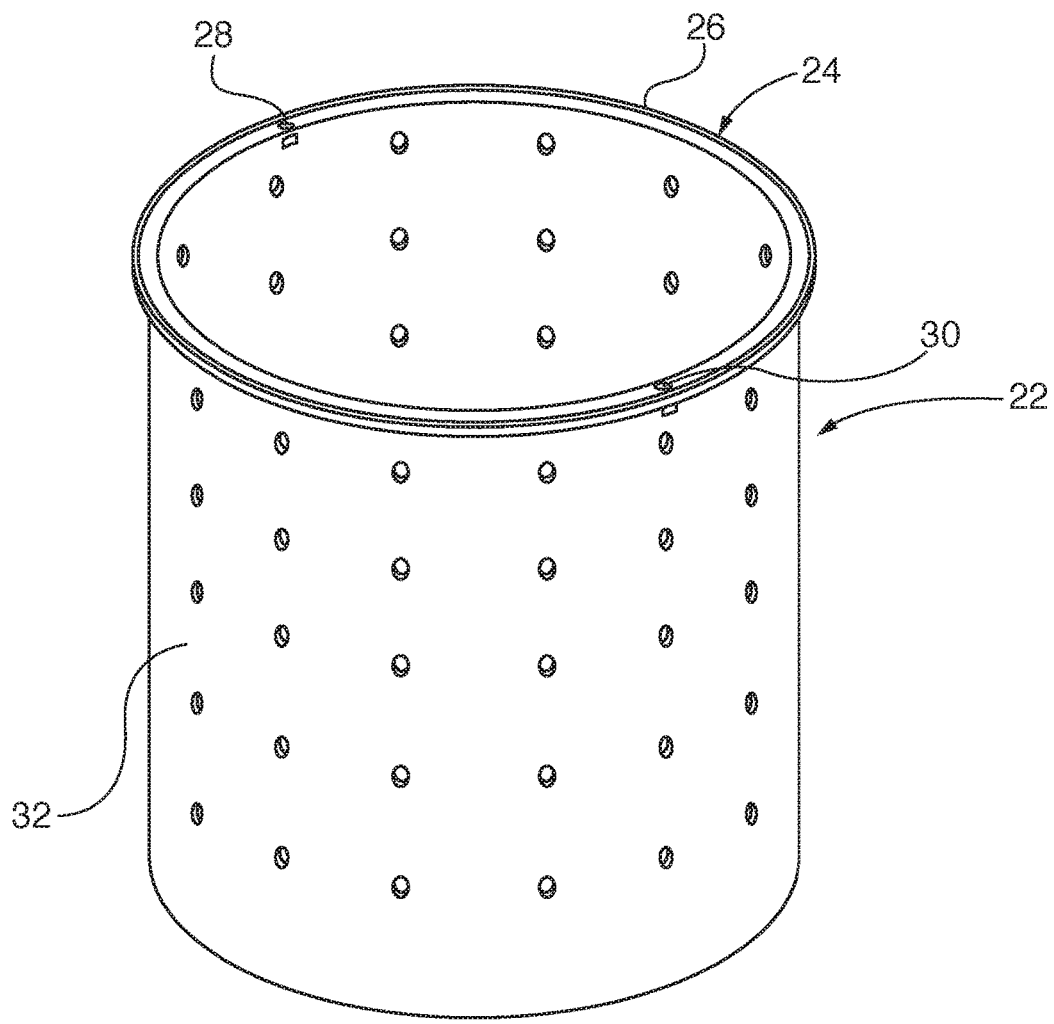
FIG. 2 is a perspective view of a known valve strainer basket of the interceptor valve of FIG. 1.
Figure 3:
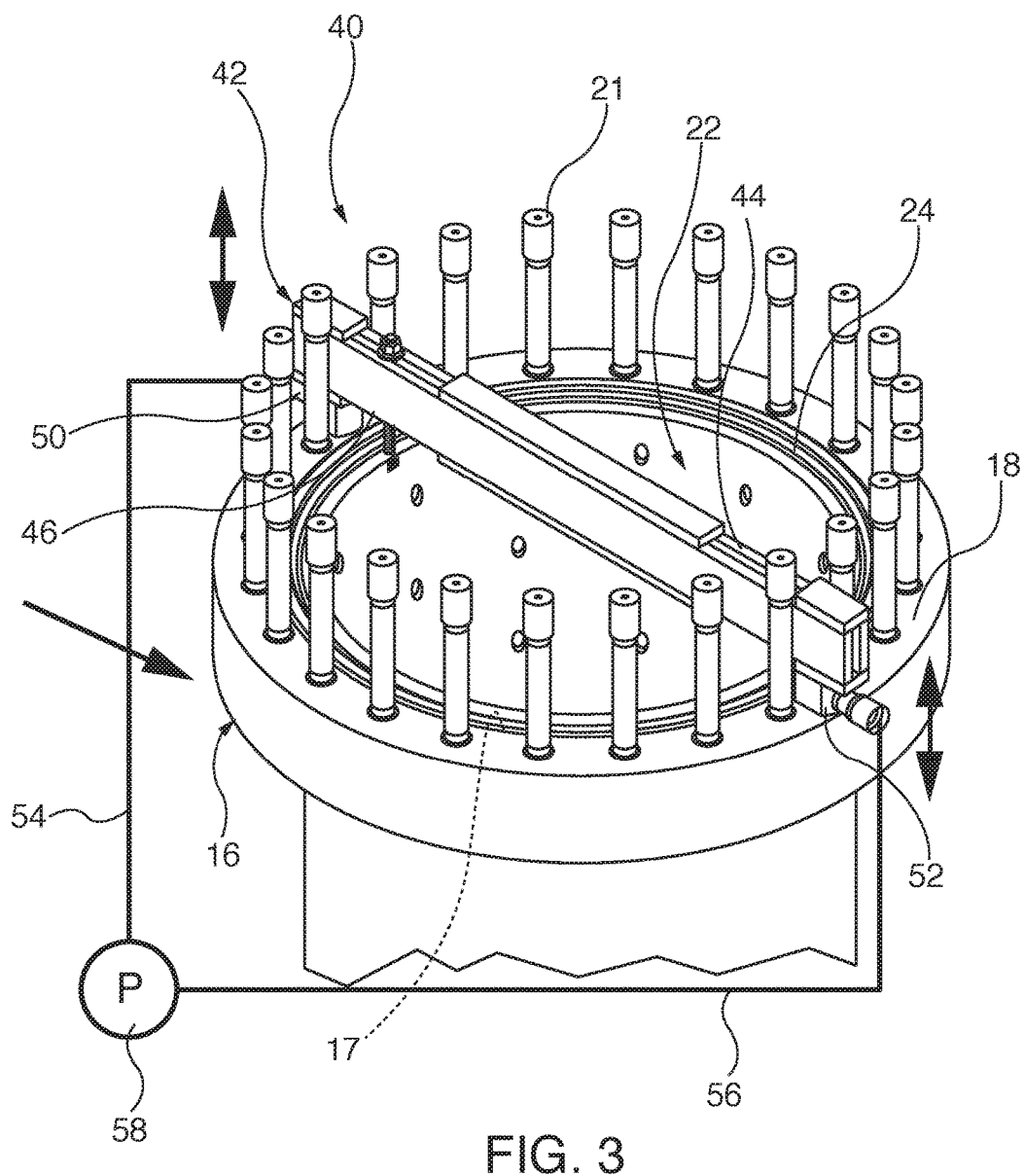
FIG. 3 is a perspective view of an exemplary embodiment of a valve strainer basket removal tool and system, with a strong back beam of the system positioned over a casing rim and nested strainer rim of a valve body, after removal of a valve body and valve bonnet.
Figure 4:
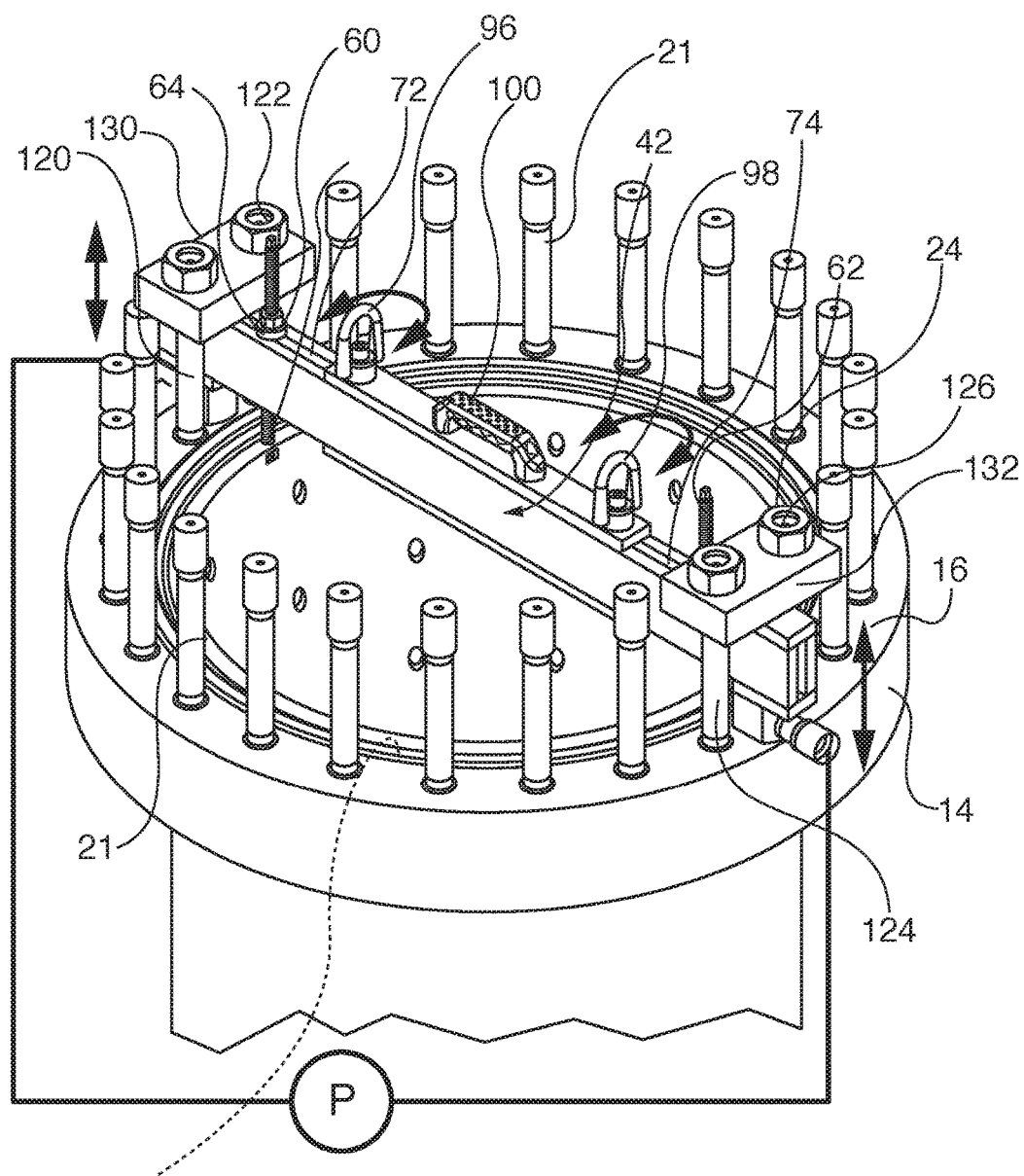
FIG. 4 is a perspective view, similar to FIG. 3, of another exemplary embodiment of a valve strainer basket removal tool and system, which includes restraining straps, for restraining inadvertent separation of the strong back beam from the casing rim.

FIGS. 3 and 4 show an embodiment of a removal tool 40 for a strainer basket 22, which includes a strong back beam 42, bridging the casing rim 16 and the strainer rim 24 resting on top of the first 50 and second 52 biasing cylinders. The strong back beam has a top surface 44 and a bottom surface 46. The first 50 and second 52 biasing cylinders rest on top of the upper surface 18 of the casing rim 16, between first 120, 122 and second 124, 126 pairs of adjoining bonnet bolts 21, on opposed sides of the casing rim, so that the cylinders are interposed between the rim and the bottom surface 46 of the strong back beam 42. The first 120, 122 and second 124, 126 pairs of adjoining bonnet bolts 21 inhibit strong back beam 42 lateral shifting beyond the circumferential spacing of the bolt pairs.

In the embodiments of FIGS. 3 and 4, the biasing cylinders 50 and 52 are pressurized fluid cylinders (e.g., pneumatic or hydraulic cylinders), which are respectively in communication with fluid lines 54 and 56, and in common communication with pump 58. The fluid lines 54, 56 and the pump 58 are shown schematically. Thus, both of the biasing cylinders 50 and 52 share a common pressure source, for equal lifting or lowering of both ends of the strong back beam 42, upon actuation of the pump 58. Alternatively, each biasing cylinder can have a separate, dedicated pressurizing source.

Referring to FIGS. 2-5, the strong back beam 42 is coupled to the strainer rim 24 of the strainer basket 22 by first 60 and second 62 threaded rods, which engage the first 28 and second 30 threaded apertures formed in the upper or outer surface 26 of the strainer rim. The first 60 and second 62 threaded rods are coupled to the strong back beam 42 by capture within first 72 and second 74 through passages formed in the beam. The first 60 and second 62 threaded rods receive respective first 64 and second 68 washers that are captured by respective first 66 and second 70 nuts above the top surface 44 of the strong back beam 42.

Figure 5:
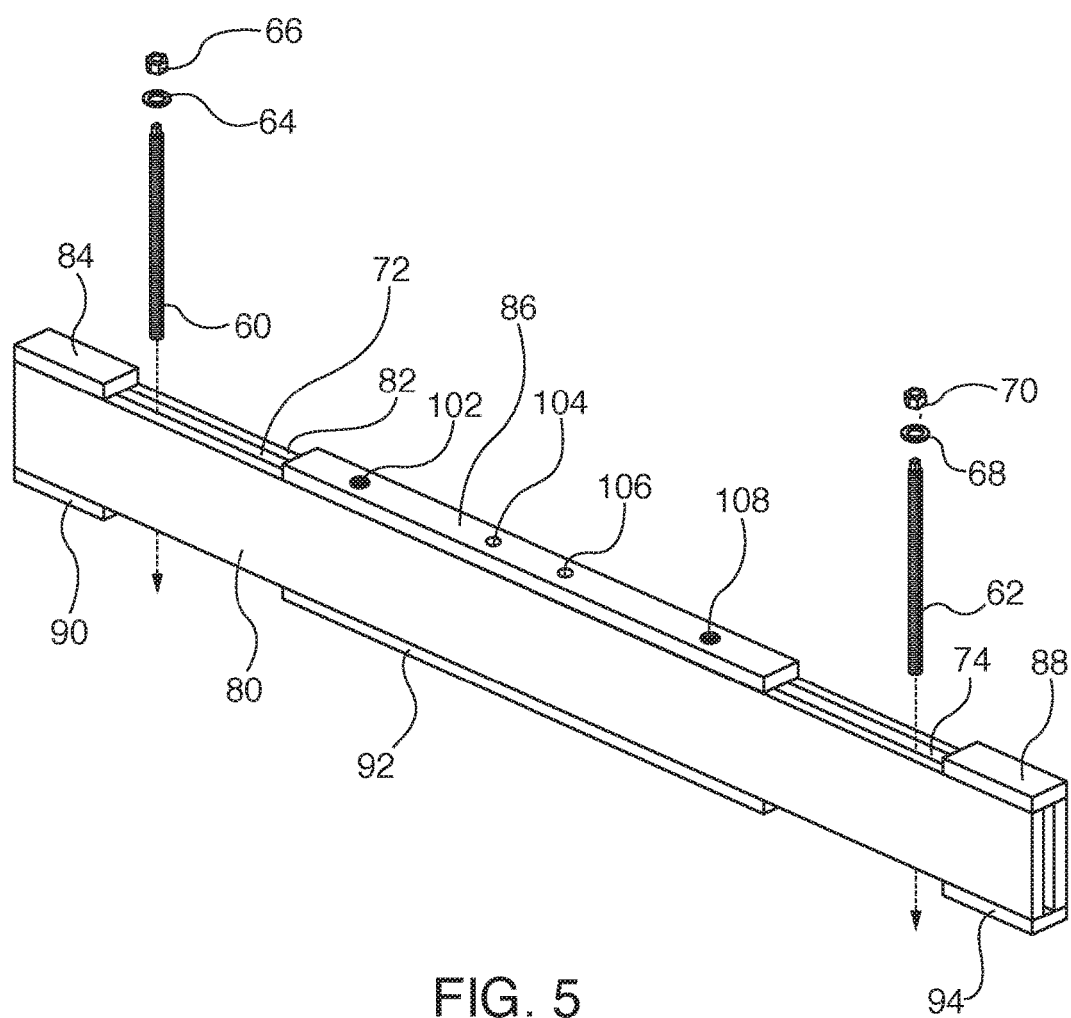
FIG. 5 is a perspective view of a strong back beam, that is constructed in accordance with an exemplary embodiment of the invention.

An embodiment of the strong back beam 42, shown in FIGS. 3-5, comprises pair of spaced, opposing plates 80 and 82, which define the first 72 and second 74 through passages for the respective first 60 and second 62 threaded rods. Upper gusset plates 84, 86 and 88, and lower gusset plates 90, 92 and 94 are welded to the opposing plates 80 and 82, forming a rigid, box-like structure, with sufficient structural strength to transfer the lifting forces necessary to separate the strainer rim 24 from the counter bore 17 of the casing rim 16, but of sufficient light weight (under 40 pounds or 18 kg) for placement by service personnel without auxiliary powered lifting equipment. In some embodiments, the strong back beam 42 includes first 96 and second 98 swivels, which are affixed to the top gusset plate 86 by respective threaded apertures 102 and 108. In some embodiments, the strong back beam 42 includes a handle 100 that is affixed to the top of gusset plate 86 by respective threaded apertures 104 and 106.

In the embodiment of FIG. 4, the removal tool system includes first 130 and second 132 beam restraints, which straddle and bridge over the strong back beam 42, for restraining inadvertent separation of the strong back beam from the upper surface 18 of the casing rim 16. Each of the first and second beam restraints comprises a respective restraining strap 130, 132, having apertures on opposite ends, into which are inserted the projecting tips of the respective first 120, 122 and second 124, 126 pairs of bonnet bolts 21. In some embodiments, the restraining straps 130, 132 are constructed of rubber sheets. As shown in the embodiment of FIG. 4, the restraining straps 130 and 132 are in turn restrained on the bonnet bolt pairs 120, 122 and 124, 126 by threaded nuts.

Figure 6:
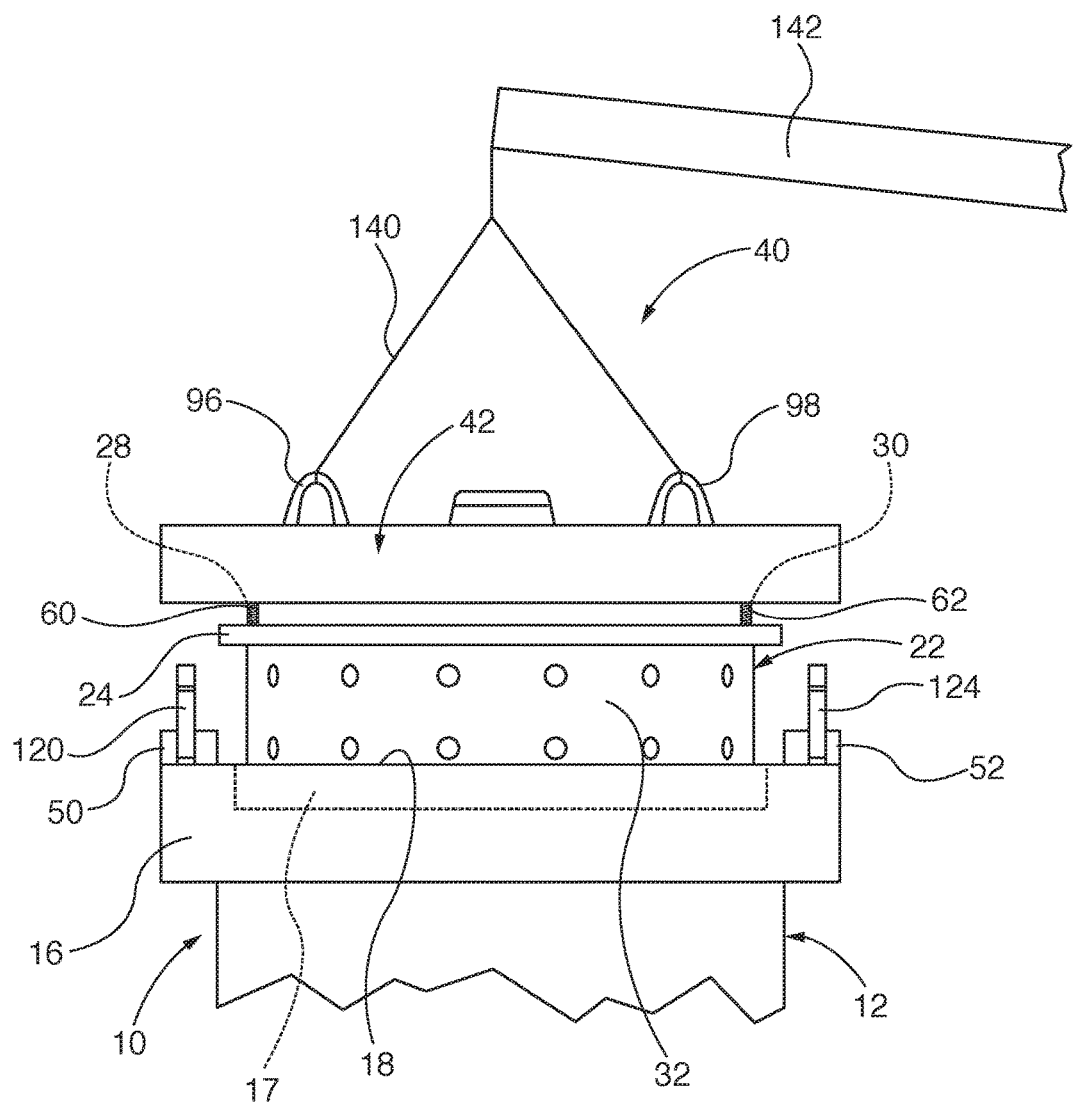
FIG. 6 is an elevational schematic view, showing removal of the valve strainer basket and the strong back beam of the basket removal system, with a crane boom that is coupled to the beam by a lifting sling.

FIG. 6 illustrates, schematically, a method for removing a valve strainer basket 22 of an interceptor-type steam valve 10 for steam turbines, by use of a provided removal tool 40. The method is also useful for removing a valve strainer basket of a control-type steam valve. The removal tool 40 includes the strong back beam 42, which as previously described, is coupled to apertures 28 and 30 in the strainer rim 24 of the strainer basket 22 by the first 60 and second 62 threaded rods. First 50 and second 52 biasing cylinders are placed on opposed circumferential sides of the top or upper surface 18 of the casing rim 16 proximate respective bonnet bolts 120 and 124. The bottom surface of the respective first and second ends of the strong back beam 42 are placed on the respective first 50 and second 52 biasing cylinders, spanning the upper surfaces 18 and 26 of the casing rim 16 and the strainer rim 24, so that the first and second biasing cylinders are interposed between the bottom surface of the beam, at first and second ends thereof and the casing rim. Thereafter, by actuating the first 50 and second 52 biasing cylinders, the strong back beam 42 lifts from the upper surface 18 of the casing rim 16. The strainer rim 24 is coupled to the strong back beam 42, so as the beam is lifted by the biasing cylinders, the strainer rim is extracted out of slidable, nested engagement within the counter bore 17 of the casing rim. Next, the valve strainer basket 22, including its strainer skirt 32 is removed from the valve casing 12 by lifting it with a crane boom 142. The crane boom 142 is coupled to the swivels 96 and 98 of the strong back beam 42, by lifting sling 140. As the crane boom 142 lifts the strong back beam 42, the latter separates from the biasing cylinders 50, 52. However, in some embodiments, the biasing cylinders 50, 52 are coupled to the strong back beam 42, so that all three of those components of the removal tool system 40 separate together from the interrupter valve 10.

If desired, the removal tool system 40 can be used to reinsert the strainer basket 22 into the valve casing 12 by pre-positioning biasing cylinders 50 and 52 on the upper surface 18 of the casing rim 16. The strong back beam 42 is coupled to the strainer basket rim 24. The coupled strong back beam 42 and the strainer basket 22 are lifted with the crane boom 142, via the lifting sling 140 and the swivels 96 and 98 interconnection, into concentric alignment with the valve plenum 14 and the biasing cylinders 50, 52. The cylinders 50 and 52 are raised sufficiently to maintain a vertical spacing gap between the strainer basket rim 24 and the counter bore 17 of the valve rim 16, when the strong beam is lowered in contact with the biasing cylinders, and the crane boom 142 lifting support is disengaged. Any fine-tuning, concentric alignment of the strainer basket rim 24 and the counter bore 17 is performed by moving the biasing cylinders 50, 52 relative to the valve rim 16. Once concentric alignment is obtained, the biasing cylinders 50, 52 are lowered, which reinserts the strainer rim 16 into engagement with the counter bore 17 of the valve 10.

Although various embodiments that incorporate the invention have been shown and described in detail herein, others can readily devise many other varied embodiments that still incorporate the claimed invention. The invention is not limited in its application to the exemplary embodiment details of construction and the arrangement of components set forth in the description or illustrated in the drawings. The invention is capable of other embodiments and of being practiced or of being carried out in various ways on either interceptor-type or control-type steam valves. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted", "connected", "supported", and "coupled" and variations thereof are used broadly and are intended to encompass direct and indirect mountings, connections, supports, and couplings. Further, "connected" and "coupled" are not restricted to physical, mechanical, or electrical connections or couplings.

What is claimed is:

1. A system for removing a valve strainer basket of an interceptor-type or control-type steam valve for steam turbines, comprising:
   a steam valve including: a valve casing, defining an internal plenum for passage of pressurized steam therein, an upper end of the casing defining a casing rim circumscribing the internal plenum, the casing rim including a counter bore, defining an inner diameter thereof, and a upper surface for opposed orientation with a valve bonnet;
   a valve strainer basket, including: a strainer rim having an outer diameter that is slidably nested within the counter bore of the casing rim, the strainer rim including an upper surface defining first portions of respective first and second coupling members, and a porous strainer skirt projecting downwardly from the strainer rim into the internal plenum of the valve casing;
a removal tool for a strainer basket, including:
a strong back beam having a top surface, a bottom surface facing and spanning the upper surfaces of the casing rim and the strainer rim, and respective first and second beam ends;
first and second biasing cylinders, respectively interposed between the bottom surface of the beam, at first and second ends thereof, and the upper surface of the casing rim, for selectively raising or lowering the beam relative to the casing and strainer rims;
second portions of respective first and second coupling members, said second portions coupled to the beam and engaged with said first portions thereof, thereby coupling the beam and the strainer rim;
an array of threaded bonnet studs projecting upwardly from the upper surface of the casing rim;
the first and second beam ends of the strong back beam and the respective first and second biasing cylinders interposed between first and second respective pairs of bonnet studs on opposed circumferential sides of the casing rim; and
first and second beam restraints respectively coupled to at least one bonnet stud of each respective first and second pairs of bonnet studs, for restraining inadvertent separation of the strong back beam from the valve casing, whereby, actuation of the first and second biasing cylinders separates the strong back beam from the upper surface of the casing rim, and extracts the outer diameter of the strainer rim out of slidable, nested engagement within the counter bore of the casing rim.

2. The system of claim 1, the first and second portions of the first and second coupling members further comprising first and second threaded apertures in the outer surface of the strainer rim and mating, first and second threaded rods that are coupled to the strong back beam.

3. The system of claim 2, further comprising the strong back beam defining respective first and second through passages extending through the beam, from the top surface to the bottom surface thereof, for receipt of the respective first and second threaded rods therein.

4. The system of claim 3, the strong back beam further comprising a pair of spaced, opposing plates, which define the first and second through passages there between.

5. The system of claim 1, the top surface of the strong back beam having a pair of swivels coupled thereto, for receipt of a lifting sling.

6. The system of claim 1, the biasing cylinders comprising pressurized fluid cylinders.

7. The system of claim 6, the pressurized fluid cylinders sharing a common pressurized fluid source, for selectively raising or lowering the strong back beam relative to the casing rim.

8. A method for removing a valve strainer basket of an interceptor-type or a control-type steam valve for steam turbines, comprising:
providing a steam valve including: a valve casing, defining an internal plenum for passage of pressurized steam therein, an upper end of the casing defining a casing rim circumscribing the internal plenum, the casing rim including a counter bore, defining an inner diameter thereof, and a upper surface for opposed orientation with a valve bonnet;
providing a valve strainer basket, including: a strainer rim having an outer diameter that is slidably nested within the counter bore of the casing rim, the strainer rim including an upper surface defining first portions of respective first and second coupling members, and a porous strainer skirt projecting downwardly from the strainer rim into the internal plenum of the valve casing;
providing a removal tool for a strainer basket, which includes:
a strong back beam having a top surface, a bottom surface, and respective first and second beam ends;
first and second biasing cylinders;
second portions of respective first and second coupling members, said second portions coupled to the beam;
placing the first and second biasing cylinders on opposed circumferential sides of the upper surface of the casing rim;
placing the bottom surface of the respective first and second ends of the strong back beam on the respective first and second biasing cylinders, spanning the upper surfaces of the casing rim and the strainer rim, so that the first and second biasing cylinders are interposed between the bottom surface of the beam, at first and second ends thereof and the casing rim;
coupling the first and second portions of each respective first and second coupling member to each other, so that the strainer rim rises with the strong back beam;
actuating the first and second biasing cylinders, separating the strong back beam from the upper surface of the casing rim and extracting the outer diameter of the strainer rim out of slidable, nested engagement within the counter bore of the casing rim; and
removing the valve strainer basket from the valve casing by lifting the strainer basket skirt above the casing rim:
the provided valve casing having an array of threaded bonnet studs projecting upwardly from the upper surface of the casing rim;
providing first and second beam restraints for coupling respectively to at least one bonnet stud;
interposing the first and second beam ends of the strong back beam and the respective first and second biasing cylinders between first and second respective pairs of bonnet studs on opposed circumferential sides of the casing rim; and
coupling the first and second beam restraints respectively to at least one bonnet stud of each respective first and second pairs of bonnet studs, for restraining inadvertent separation of the strong back beam from the valve casing.

9. The method of claim 8, the provided first and second portions of the first and second coupling members further comprising first and second threaded apertures in the outer surface of the strainer rim and mating, first and second threaded rods that are coupled to the strong back beam, wherein said coupling is performed by threading the first and second threaded rods into their corresponding first and second threaded apertures, and coupling the threaded rods to the strong back beam.

10. The method of claim 9, the provided strong back beam further comprising defining respective first and second through passages extending through the beam, from the top surface to the bottom surface thereof, for receipt of the respective first and second threaded rods therein, and coupling the threaded rods to the strong back beam by passing them through the respective first and second passages.

11. The method of claim 10, the provided strong back beam further comprising a pair of spaced, opposing plates, which define the first and second through passages there between, and coupling the threaded rods to the strong back beam by passing them through the respective first and second passages.

12. The method of claim 8, the provided strong back beam further comprising a pair of swivels coupled thereto, for receipt of lifting sling; and removing the valve basket by:
- coupling a lifting sling to the pair of swivels;
- coupling a crane to the lifting sling; and
- lifting the strainer skirt above the casing rim, with the crane.

13. The method of claim 8, the provided biasing cylinders further comprising pressurized fluid cylinders; and actuating said pressurized fluid cylinders by pressurizing fluid in said pressurized fluid cylinders.

14. The method of claim 8, at least one of the provided first and second beam restraints comprising a restraining strap defining first and second restraining-strap apertures, for receipt of the respective pair of bonnet studs; and coupling said restraining strap to the respective pair of bonnet studs by:
- straddling said beam restraining strap over the strong back beam;
- inserting said corresponding pair of first and second bonnet studs into the respective first and second restraining strap apertures; and
- securing the restraining strap to the bonnet stud with a fastener.

15. The method of claim 8, the steam valve comprising an interceptor-type steam valve.

16. The method of claim 8, the steam valve comprising a control-type steam valve.

* * * * *